July 14, 1925.
C. RYDER
1,545,698
VEHICLE LAMP MOUNTING DEVICE
Filed Oct. 30, 1922
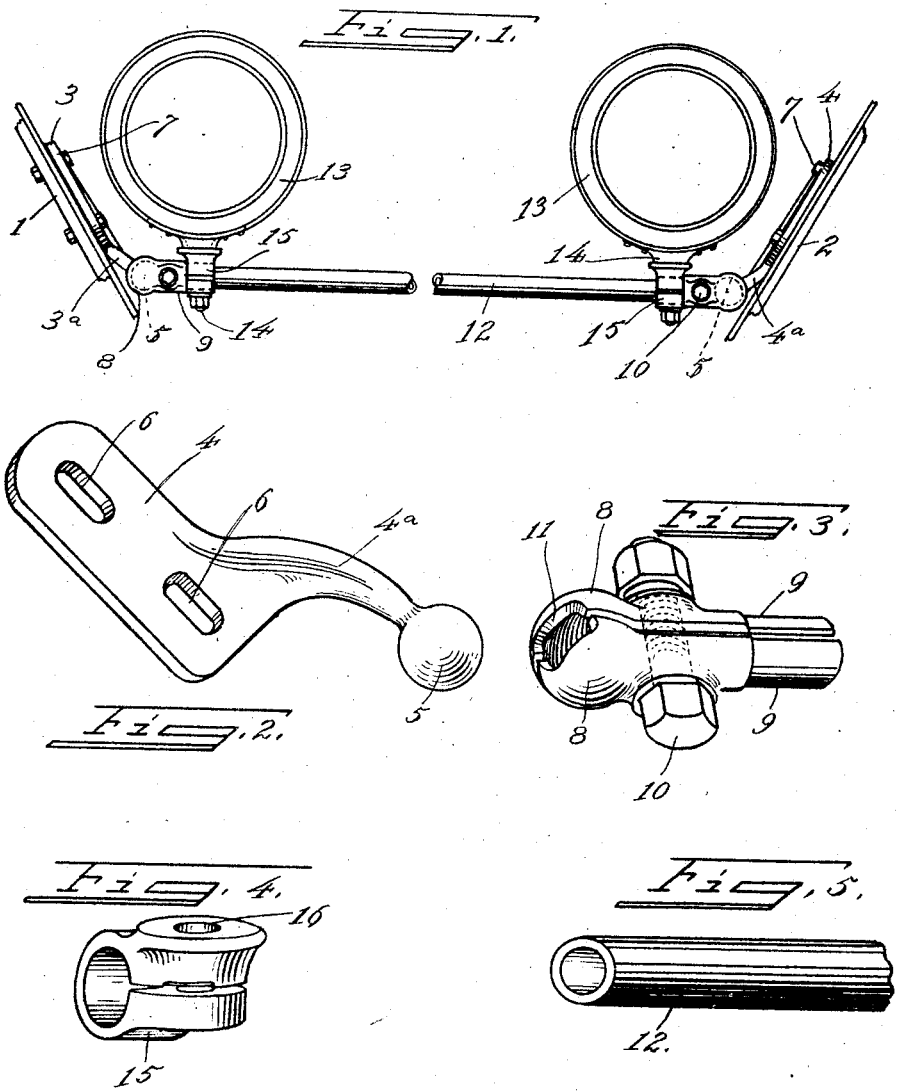
INVENTOR:
Charles Ryder
BY
ATTORNEYS.

Patented July 14, 1925.

1,545,698

UNITED STATES PATENT OFFICE.

CHARLES RYDER, OF CINCINNATI, OHIO, ASSIGNOR, BY MESNE ASSIGNMENTS, TO THE THOS. J. CORCORAN LAMP CO., OF CINCINNATI, OHIO, A CORPORATION OF OHIO.

VEHICLE-LAMP-MOUNTING DEVICE.

Application filed October 30, 1922. Serial No. 597,762.

*To all whom it may concern:*

Be it known that I, CHARLES RYDER, a citizen of the United States, and a resident of Cincinnati, in the county of Hamilton and State of Ohio, have invented certain new and useful Improvements in Vehicle-Lamp-Mounting Devices, of which the following is a full, clear, and exact description, reference being had to the accompanying drawings, forming part of this specification.

My invention relates to devices for mounting head lamps on motor vehicles, and more particularly to devices which permit of the new barrel-shaped lamps on vehicles designed for the older conical-shaped lamps.

I do not claim that I am the first to mount automobile head lamps on a cross rod tied to the front fender bracket arms. Nor do I claim to be the first to provide a device whereby a cross rod may be added to the equipment of a car, thereby providing a means for mounting a new style of lamp, which would not fit properly with the mounting equipment furnished with the vehicle.

My object is to provide a cross bar which may be used with vehicles already built or made part of the equipment of motor vehicles in the first place, and which is adjustable to a very wide range of vehicles without modification.

This adjustability to various makes of vehicles in its best form requires a universal form of mounting the ends of the cross bar to the bracket elements associated with the fender brackets. It best requires a bar which is adjustable for length. It best requires a lamp mounting adjustable for position in front or behind the bar, and a bracket device which can be shifted from left to right to control further the position of the ends of the cross bar with relation to the vehicle.

These various points are all taken care of in my invention, and I accomplish them and the objects above stated by that certain construction and arrangement of parts to be hereinafter more specifically pointed out and claimed.

In the drawings,

Figure 1 is a front elevation showing the mounting of the device of my invention on fender brackets.

Figure 2 is a perspective view of one of the bar mounting plates.

Figure 3 is a like view of one of the universal joint members.

Figure 4 is a like view of one of the lamp supporting bar socket pieces.

Figure 5 is a perspective view of part of the cross bar.

In the example of my invention selected for purposes of illustration, the parts 1 and 2 are the left and right hand fender brackets of a motor vehicle. As is usual, these brackets are positioned by the builder of the vehicle in the most effective point for support of the fender and at an angle to suit the design of fender, and naturally no two cars use a fender bracket which is alike in angle or position, unless they happen to use exactly the same fender, in exactly the same position with reference to the chassis.

As mounting plates for my cross bar I provide the plates 3 and 4, formed as a left and a right. The plate 3 has an arm extending from one end thereof, as at 3ª, which is directed downwardly and to the left. The plate 4 has a like arm, as at 4ª, directed downwardly and to the right. Each arm turns outwardly in a direction away from the plate, at its lower end, and is equipped with a unitary ball 5. Each plate has elongated slots 6, 6, therein adapted to receive the mounting bolts 7 to be found in the fender brackets in the vehicle, and regularly used to mount the fenders or mount a replaced lamp bracket on the fenders.

For engaging the balls of the two mounting plates I provide ball socket members formed of halves 8, 8, and having extensions of semi-cylindrical nature at 9, 9. These two members are adapted to be held together over the balls by means of bolts 10, which have a clamping action on the ball and also on the cross bar, as will be noted.

The ball socket portions 8, 8, are cut away at 11, to permit of the entrance of the ball arms and to permit latitude of movement of the ball arms without requiring an open relation between the socket portions.

The cross bar 12 is of any usual design, such as a piece of pipe, which will fit slidably within the extensions 9, 9, of the ball socket members. There will be two or three inches of adjustability of the cross bar in each ball socket extension, giving more than enough to permit of fitting up the present styles of motor vehicles.

The lamps 13 of present day type have supporting or mounting rods 14. I provide for these rods more particularly in the selected form of device for mounting the lamps on the cross rod. Thus I provide split collar members 15 which are of a size to fit snugly over the extended ends of the ball socket members, when same are located about the cross bar. The lamp rods are set in through the apertures 16 in the collars and bolted down fast, thereby clamping the collars over the ball socket pieces and adding to the grasp of these pieces on the cross rod. The effect of the split ball socket extensions also tends to hold the lamp mounting collars very tightly in position.

It will be observed that the collars may be placed on the cross rod, or rather the ball socket arms, with either the bolt holes to the front or rear of the cross bar.

Also the said collars may be set in any desired position circumferentially of its mounting devices, thereby providing a quick and easy way to set the lamps, as to angularity of the beam of light.

It will be noted that the slant of the mounting plates, dependent upon the motor vehicle structure on which they are to be mounted, does not affect the position of the cross bar, because of the universal joint. Also it will be noted that by shifting the mounting plates from left to right, the ball arms may be made to extend rearwardly of the plates on both sides or forwardly, as may be demanded to make a fit.

In a V-shaped radiator the cross bar will have to be bent at its central portion to clear the apex of the radiator. Also, as stated, the mounting of the cross bar makes it adjustable for length. In practice it will not be necessary to machine the balls, because a binding grasp on the balls is to be desired, once the parts are clamped over them.

As stated, I have attempted to describe but one illustration of my invention in the above specification, the novelty of which I will express in the claim that follows.

Having thus described my invention, what I claim as new and desire to secure by Letters Patent, is:—

A lamp mounting device comprising a cross bar, mounting elements for the cross bar, and universal joint connections between the mounting elements and the cross bar, each universal joint connection comprising a ball member on the mounting element, a split ball socket on the bar for adjustability longitudinally of the bar, and a lamp mounting collar mounted over the split socket member and arranged for rotatability of the collar on the socket in a plane transversely of the axis of the bar, said collar being adapted to clamp the socket in adjusted position on the bar and simultaneously therewith to mount a lamp rigidly and to clamp itself against rotation from adjusted position relatively to the socket and bar.

CHARLES RYDER.